Dec. 6, 1966   F. E. BUSCHBOM   3,289,863
CONVEYING MEANS
Original Filed May 6, 1960   3 Sheets-Sheet 1

INVENTOR
BY FLOYD E. BUSCHBOM
Braddock+Burd
ATTORNEYS

Dec. 6, 1966 F. E. BUSCHBOM 3,289,863
CONVEYING MEANS
Original Filed May 6, 1960 3 Sheets-Sheet 2

INVENTOR
BY FLOYD E. BUSCHBOM
Braddock+Burd
ATTORNEYS

Dec. 6, 1966   F. E. BUSCHBOM   3,289,863
CONVEYING MEANS

Original Filed May 6, 1960   3 Sheets-Sheet 3

INVENTOR
BY Floyd E. Buschbom
Braddock+Burd
ATTORNEYS 3,289,863
CONVEYING MEANS
Floyd E. Buschbom, Long Lake, Minn., assignor to Vandale Corporation, Long Lake, Minn., a corporation of Minnesota
Application May 22, 1963, Ser. No. 282,475, now Patent No. 3,232,456, dated Feb. 1, 1966 which is a division of application Ser. No. 27,435, May 6, 1960. Divided and this application Dec. 1, 1965, Ser. No. 510,907
10 Claims. (Cl. 214—17)

This application is a division of application Serial No. 282,475 filed May 22, 1963, now U.S. Patent No. 3,232,-456. Application Serial No. 282,475 is a division of application Serial No. 27,435 filed May 6, 1960, now abandoned.

This invention relates to new and useful improvements in chipping and conveying means for cutting, shredding and conveying materials and particularly to helical conveyors used to cut, shred and convey material such as corn and grass ensilage, haylage and the like.

It is the object of this invention to provide a new and useful spiral or helical conveyor.

A further object of the invention is to provide for a silo unloader specific ensilage collector arm structure in combination with an impeller housing for efficient feeding of ensilage into an empeller used to move the ensilage from the silo.

Still a further object of this invention resides in the provision of a material collector arm having new and unique flighting arrangement for cooperation with an impeller housing.

More specifically it is the object of this invention to provide an improved horizontal helical conveyor having planar members in combination with an impeller housing having circumferential and side openings which insures uniform and substantially continuous flow of material into an impeller located within the impeller housing.

The silo unloader shown in FIGURES 1 to 4 is operatively positioned in a conventional tower silo having a cylindrical upright wall 301 and a plurality of vertically aligned apertures 302, open down to the level of the ensilage and closed below that point. Cross bars 303 separate the aligned apertures 302.

Figure 1:
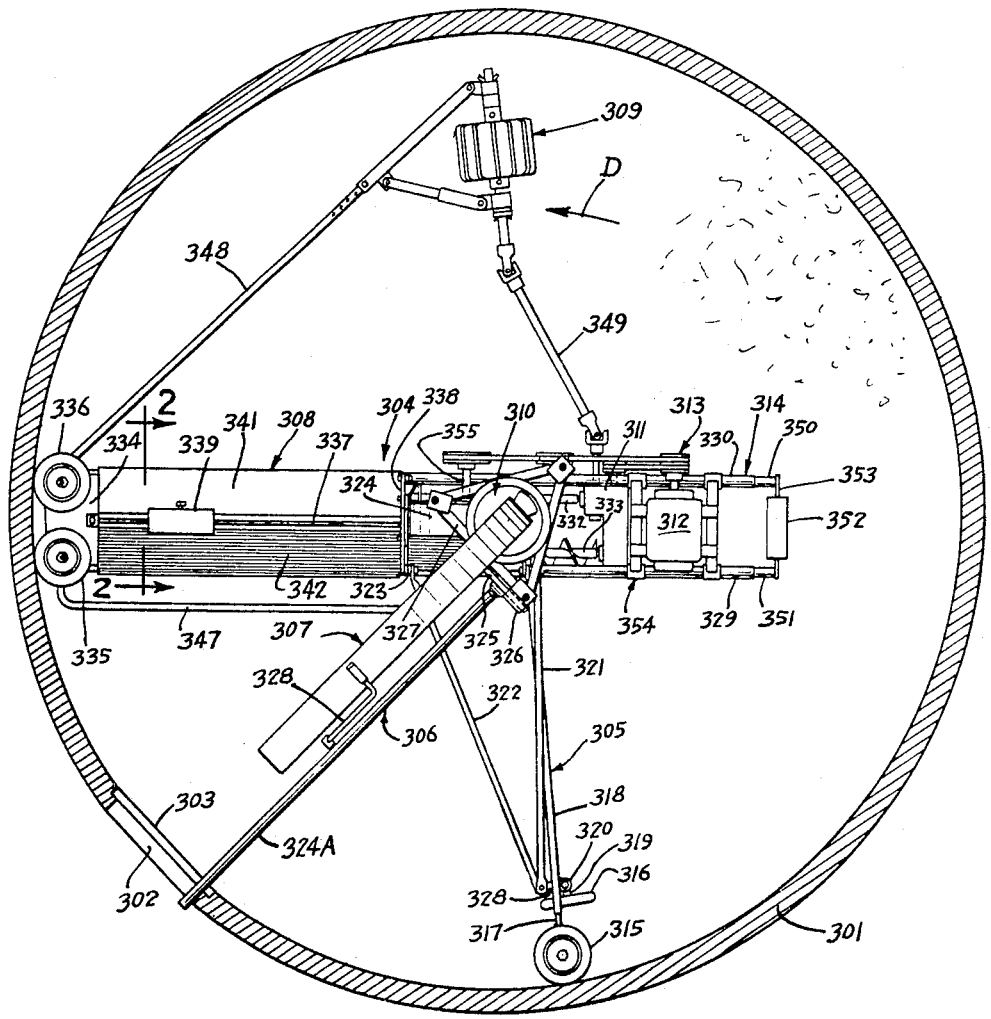
FIGURE 1 is a top plan view of a silo unloader of this invention positioned on the top surface of ensilage within a tower silo shown in horizontal section.

The silo unloader generally designated 304 is shown in plan in FIGURE 1, and includes a guide arm assembly generally designated 305, a torque arm assembly generally designated 306, a chute generally designated 307, a collector arm generally designated 308, a drive hub assembly generally designated 309, a suspension ring assembly 310, and gear box assembly 311, motor 312, drive structure 313 and frame 314.

Guide arm assembly 305 includes a wheel 315 journalled about a vertical axis, and a wheel 316 journalled about a horizontal axis. Wheel 315 is journalled on a guide arm extension 317 which is in the form of a rod having an outside diameter slightly smaller than the inside diameter of guide arm 318, which is a sleeve or pipe, so that extension 317 may be inserted therein and extended or retracted for adjustment. When proper adjustment is secured, it is secured fixedly therein by a set screw or other suitable means.

Wheel 316 is journalled to a guide arm support rod 319 received in a short sleeve 320 welded or otherwise secured to the advance side of the arm 318. It may be moved upwardly or downwardly therein, since the external diameter of rod 319 is slightly less than the internal diameter of the sleeve 320, and then positioned securely by a set screw, or other appropriate means.

An upper guide arm brace 321 and a lower guide arm brace 322 are each bolted by a flattened end to a lug 328 positioned on the trailing side of guide arm 318. These arms diverge from that point, arm 322 being bolted by a flattened end to the frame 314 at lug 323 and arm 321 being bolted to the impeller housing 324 by having its flattened end seated on an extending lug and bolted thereto. The upper and lower guide arms thus assume the position shown in FIGURE 1.

The torque arm assembly, generally designated 306 comprises an elongated tubular member or bar 324A having an extension such that it extends through the silo wall 301. Rod 324A is of such an extension as to accommodate the axial reciprocation of the unloader with respect to silo wall 301. A bar 325 is secured to the inner end of rod 324A to form a T. One end of the bar 325 passes through sleeve 326 and is maintained in position by a cotter key for pivotal movement about a horizontal axis therein. The other end of bar 325 engages a bearing plate (not shown) depending from angle member 327 of a supporting tripod. Since the collecting arm 308 moves in the direction of the arrow D within the silo, it will be appreciated that the rod 324A will assume the position of FIGURE 1, that is, adjacent the edge of the silo aperture, which is in the direction of travel of arm 308, or what may be called the leading edge of the aperture. In this position, the rod 324A prevents rotation of the supporting triangle, the suspension and support ring 310 and chute 30T.

Secured to the top of the ring 310 is a chute generally designated 307 of the type shown in Patent 2,877,907, supported by a rod 328 from a sleeve pivoted on a stud attached to torque arm 324A, rod 328 having an upper turned end positioned in a second suitable sleeve secured to chute 307.

The collector arm assembly 308 comprises frame members 329 and 330 extending the full length of the unloader as shown in FIGURE 1. These frame members are appropriately braced at suitable intervals. Bolted or otherwise secured to the frame members 329 and 330 is a gear box assembly 311, positioned below the frame members 329 and 330 and extended generally parallel to the frame members are a leading elongated rotary means 30 and a trailing elongated rotary means 35 operative to collect and convey ensilage in a generally linear path into the impeller housing 324. The rotary means 30 and 35 are positioned generally parallel to each other with the space between the rotary means being unobstructed. Rotary means 30 is shown as a leading auger having a center shaft 333 and helical fightings 361 and 366. Rotary means 35 is shown as a trailing auger having a center shaft 332 and helical fightings 356 and 359. One or both of the rotary means can be scarifying members operative to cut the top surface of the ensilage and convey the ensilage in a generally linear direction into the impeller through the bottom opening in the impeller housing. The gear box assembly has a pair of drive shafts which support one end of each of the auger shafts 332 and 333. The other ends of shafts 332 and 333 are journalled in suitable bearings in depending members of outboard frame support (not shown). Each shaft has a wall cleaner secured thereto as shown in Patent 2,719,058.

The outboard frame support has a flat horizontal plate portion 334 joined to and extending between frame members 332 and 333. Plate portion 334 is bolted to a pair of flat strap members in turn welded to members 332 and 333.

Guide wheels 335 and 336 are journalled on plate 334 for rotation about a vertical axis, and for engagement with the interior surface of the silo wall 301 for guiding the unloader in its travel within the silo and for positioning wall cleaners with respect to the silo wall.

A T-bar 337 extends between plate 334 and cross brace 338. Brace 338 extends between members 332 and 333 and is bolted to lugs upstanding therefrom. T-bar 337 is secured by a foot bolted or otherwise affixed to plate 334 and by a second inturned foot bolted or otherwise secured to cross brace 338. Positioned on the T-bar 337 is a weight 339 having a set screw 340 for positioning it after it has been adjusted by sliding it inwardly or outwardly on bar 337 (rightwardly or leftwardly with reference to FIGURE 5). Thus, the weight 339 serves as an adjustable means for controlling the pressure which the outward end of the collector arm engages on the ensilage.

Figure 2:
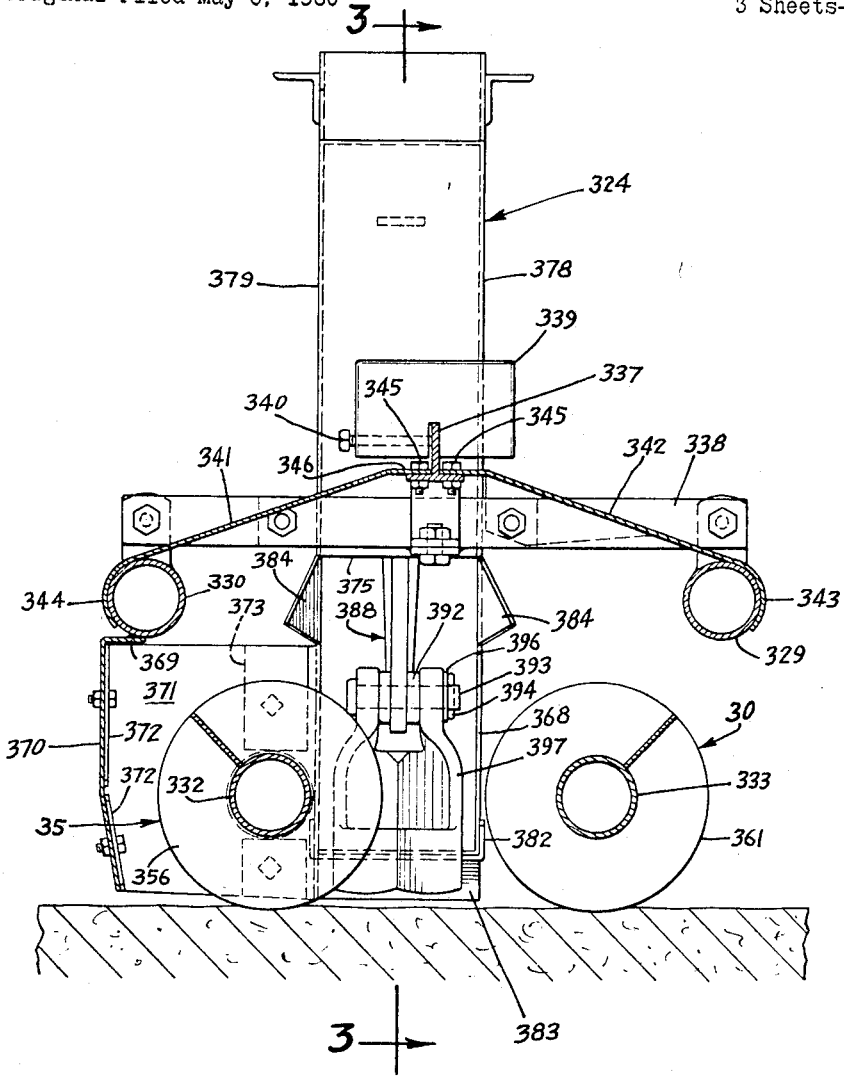
FIGURE 2 is an enlarged sectional view taken along the line and in the direction of the arrows 2—2 of FIGURE 1.

Two top shield members 341 and 342 are positioned to extend from overlying engagement with one of the flanges of inverted T-bar member 337 downwardly and around their respective frame members 332 and 333. As shown in FIGURE 2, shield members 341 and 342 are positioned on members 329 and 330 by having edges 343 and 344 curled thereabout and are secured to the T-bar by bolts 345. Thus, in removal or insertion the curled edges would be positioned about the respective frame members and the opposite edges 346 positioned over the T-bar flanges and bolts 345 inserted to retain the top shield portions 341 and 342 in position. A guard rod 347 extends between brace 322 and the outboard end of frame member 329. It is provided with flattened ends secured to lugs on these respective members.

The drive hub assembly 309 is provided with a tie bar 348, as shown in FIGURE 1, through which driving force is imparted to the unloader. It is also provided with a drive shaft 349 which serves to rotate the hub and which receives power from gear box assembly 311.

Frame extensions 350 and 351 are adjustably secured to frame members 329 and 330 (by set screws or the like, not shown) and support a counterweight 352 on a cross bar 353 extending therebetween. The motor 312 is mounted on a platform 354, supported on frame members 329 and 330 as shown in FIGURE 1. Through belt drives, as shown, the motor 312 drives the gear mechanism in housing 311 from which the auger shafts 332 and 333 are driven and from which the drive shaft 349 is driven. In such fashion motor 312 also drives the shaft 355 for the central impeller in housing 324.

Figure 4:
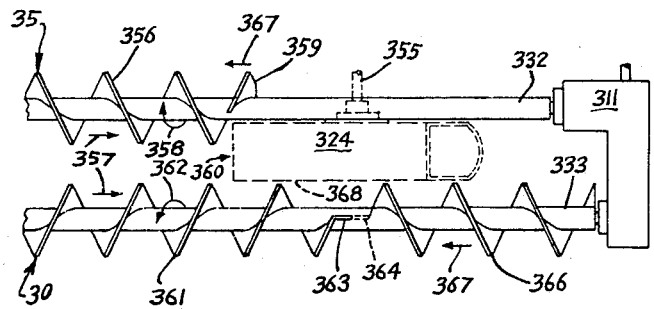
FIGURE 4 is a partially fragmentary pan, partially phantom view illustrating cooperation of the collector arm auger with the central impeller.

As is shown in FIGURE 4, the auger flighting 356 is a righthand flighting when viewed in the direction of the arrow 357, in which direction material is conveyed as the shaft 332 rotates in the direction of the arrow 358. A reverse half flight section 359 is positioned in substantially continuous extension with flight section 356 and in the relation shown with reference to the front entrance 360 of impeller housing 324. This reverse flighting 359 blocks further travel of material in the direction of the arrow 357 adjacent the entrance to the impeller housing so that such material will be conveyed into the impeller at end 360.

The flighting 361, when viewed in the direction of the arrow 357 is a lefthand flighting and serves to convey material in the direction of the arrow 357 as the shaft 333 rotates in the direction of the arrow 362. A flat straplike extension or paddle 363 is provided at the inboard end of flighting 361, and at an axial position with reference to shaft 333 slightly to the outboard side of the intersecting prolongation of the axis of shaft 355.

Positioned on the opposite side of shaft 333 is a second strap-like extension or paddle 364 which forms a continuation of the reverse flighting 366 which flighting conveys material in the direction of the arrow 367. Paddles 363 and 364 are located in the area or zone adjacent the side opening in the impeller housing 324, generally in an upright plane projected through the axis of shaft 355.

The particular cooperation of the forward and reverse flighting of the augers of the collecting arm, and the co-operation and location of the straplike members 363 and 364 with impeller housing 324 provides that material be gathered and brought inwardly by the double augers, precluded from continuing along the rear of the impeller housing by flighting 359, and brought into the impeller housing at front entrance 360 and through its side entrance 368. Flighting 361 serves to bring the material inwardly to force it in at 368 and 369. Straps 363 and 364 serve additionally to direct material inwardly in a direction axial to impeller shaft 355. Flighting 366 collects material and brings it into communication with blades or straps 363 and 364 to force a stream of material inwardly in a direction axial with shaft 355. Thus, it will be seen that material will enter the impeller housing at front entrance 360 and side entrance 368 by being urged in that direction through such cooperation.

Welded or otherwise secured to the bottom of frame member 330 by its inturned end 369 is a collector shield 370 which extends the length of auger flighting 356 and 359. An end shield 371 is bolted by turned edges 372 to shield 370 to a flange 373 of housing 324.

Figure 3:
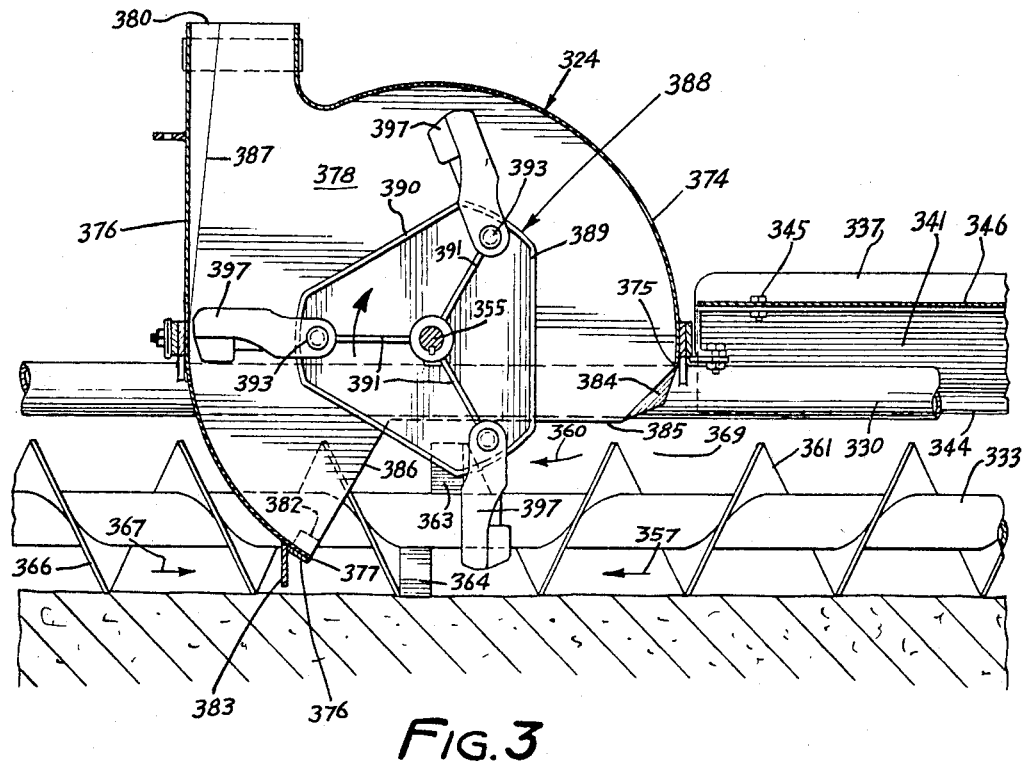
FIGURE 3 is a vertical sectional view taken along the line and in the direction of the arrows 3—3 of FIGURE 2.

The central impeller housing 324 comprises a front wrap 374 which terminates at 375 as shown in FIGURE 3. It also includes a rear wrap 376 terminating at edge 377 which with spaced upright side plates 378 and 379 form a scroll housing having an outlet 380, a front tangential entrance at 360, and a side entrance at 368. Rear wrap 376 is provided with a strap or plate member 381 having one edge flush with edge 377 and positioned thereunder. It has upturned ends 382 which are positioned on plates 378 and 379, respectively and welded or otherwise secured thereto. Thus, member 381 serves to reinforce edge 377 and to provide a cutting edge, or dividing edge for the conveyed stream of material. Welded to the rear wrap 376 behind member 381 is a stop bar 383 extending thereacross which serves to collect ensilage which would otherwise pass therebeyond and retain it for accumulation and entrance into the impeller housing 324.

Each of the plates 378 and 379 flare outwardly adjacent edge 375 of wrap 374 to form outwardly extending triangular portions 384 as shown in FIGURE 6. While the side plate 379 has a bottom edge which extends substantially circularly to its junction with portion 373, side plate 378 has a bottom portion removed to horizontal edge 385 in a vertical direction and to inclined edge 386 to form an obtuse angle cutout as shown in FIGURE 3. This is the cutout forming the side entrance previously designated 368.

Starting at portion 386 the rear wrap 376 is progressively rounded and side plates 378 and 379 bevelled so that they terminate at edge 387, to which the edges of wrap 376 are joined so that the exit 380 of the housing 324 assumes the rounded configuration shown in FIGURE 8.

Located within the impeller housing 324 is an upright impeller or rotor 388 comprising a central impeller disc 389 of a configuration shown in FIGURE 3. Disc 389 is formed from a circular segment with arcuate portions removed so that it assumes the configuration of a triangle with rounded corners. Disc 389 has peripheral strengthening flange 390 and radial strengthening flanges 391. It is also provided with a plurality of bosses 392 apertured to receive the pins 393 secured in position by cotter keys 394 and serving with washers 396 to retain the paddles 397 thereon. The center hub of disc 389 is keyed to shaft 355.

The specific embodiment described is given by way of example only and the invention is limited only by the terms of the appended claims.

I claim:

1. In a silo unloader collector means, a leading elongated auger member and a trailing elongated auger member positioned substantially parallel to each other and extended generally horizontally over the surface of the ensilage, the space between said leading auger member and trailing auger member being unobstructed, an upright impeller housing having a peripheral end wall and an upright leading side wall, said side wall positioned adjacent the inner end section of the leading auger member, said end wall having a lower front tangential opening for receiving material from said auger members and an opening for expelling material from the housing and said side wall having a lower opening for receiving material from the leading auger member, an impeller rotatably mounted on the housing for rotation about a generally horizontal axis to move material through the housing generally in the plane of movement of the material toward the housing, said trailing auger member terminating adjacent the front of said impeller housing, said trailing auger member having spiral flighting to convey ensilage to said impeller housing, said leading auger member having spiral flighting for conveying material toward said housing, the flighting on the leading auger having an inner end terminating substantially at the upright plane of the axis of rotation of the impeller, at least one upright flat member secured to the leading auger adjacent the inner end of the flighting on the leading auger member for moving material into said impeller housing through the opening in the leading side wall, said leading auger member having a second flighting extended beyond the axis of said impeller for conveying material in a direction reverse to said first flighting, drive means for swinging said leading auger member and trailing auger member in a generally circular path about a generally upright axis simultaneously with the conveying rotation of said leading auger member and trailing auger member about their own longitudinal axes whereby material is gathered and conveyed by the leading auger member and trailing auger member and moved in a linear direction toward said impeller housing through the front tangential opening and the side opening of the impeller housing into engagement with the impeller which moves the ensilage upwardly in the plane of the linear direction through the impeller housing discharge opening.

2. The silo unloader collector means defined in claim 1 further characterized by a short section of reverse spiral flighting on the inner end of said trailing auger member to preclude conveying of ensilage beyond the front of the impeller housing.

3. In a material handling apparatus a generally upright impeller housing having a leading side wall and an opening for discharging material from said housing, said side wall having a lower side opening for receiving material, an impeller rotatably mounted on the housing for rotation about a generally horizontal axis to move material through the housing, conveying and cutting means including an elongated rotary means for collecting and moving material in a general linear direction toward said housing generally normal to the axis of rotation of the impeller, said rotary means having an inner end section located forwardly adjacent the lower opening in said leading side wall, planar projected means secured to said inner end section for assisting in moving material through the opening in the leading side wall, said planar means located generally in the upright plane passing through the axis of rotation of the impeller, and drive means for swinging said rotary means and housing in a general circular path about a generally upright axis simultaneously with rotation of said rotary means whereby material is gathered and conveyed by the rotary means toward said impeller housing and moved into said housing in the path of rotation of the impeller which moves the material through the housing.

4. The material handling apparatus defined in claim 3 wherein said rotary means is an auger having a first helical flight having an inner end section terminating generally in the plane of the axis of rotation of the impeller and a second reverse flight having an inner end terminating adjacent the axis of rotation of the impeller, said planar projected means located between the inner end sections of the first flight and the second flight.

5. The material handling apparatus defined in claim 4 wherein said second reverse flight extends beyond said impeller housing.

6. The material handling apparatus defined in claim 3 wherein said conveying and cutting means further includes a trailing auger positioned substantially parallel to the rotary means and extended generally horizontally over the surface of the material, the space between said rotary means and trailing auger being unobstructed, said housing having an end wall with a lower front opening, said trailing auger having an inner end terminating adjacent the lower front opening of the housing whereby on rotation of said rotary means and said auger material is moved in a generally linear direction into the impeller housing through the side opening and the front opening.

7. The material handling apparatus defined in claim 6 wherein said trailing auger has a short section of reverse spiral flighting on the inner end thereof to preclude conveying of material beyond the front of the impeller housing.

8. The material handling apparatus defined in claim 3 wherein said rotary means comprises an auger having a helical flight, said helical flight terminating forwardly adjacent said lower opening in the leading side wall of the impeller housing.

9. The material handling apparatus defined in claim 3 wherein said elongated rotary means comprises an auger having a helical flight terminating forwardly adjacent said lower opening in the leading side wall of the housing and said planar projected means secured adjacent to the inner end section of the helical flight of the auger.

10. For the unloader collecter means defined in claim 1 wherein the second flighting on said leading auger member extends beyond said impeller housing.

References Cited by the Examiner

UNITED STATES PATENTS

| | | | |
|---|---|---|---|
| 2,794,560 | 6/1957 | Buschbom | 214—17 |
| 3,079,016 | 2/1963 | Dretzke | 214—17 |

GERALD M. FORLENZA, *Primary Examiner.*

ROBERT G. SHERIDAN, *Examiner.*